US008196373B2

(12) United States Patent
Breck et al.

(10) Patent No.: US 8,196,373 B2
(45) Date of Patent: Jun. 12, 2012

(54) POUCH MAKING PROCESS INCLUDING USE OF LIQUID PACKAGING FILMS OF POLYETHYLENE AND POLYPROPYLENE BLENDS

(75) Inventors: Alan Keith Breck, Kingston (CA); Nicholas Farkas, Glenburnie (CA); Yuqi Cai, Kingston (CA)

(73) Assignee: Liqui-Box Corporation, Worthington, OH (US)

(*) Notice: Subject to any disclaimer, the term of this patent is extended or adjusted under 35 U.S.C. 154(b) by 13 days.

(21) Appl. No.: 12/858,008

(22) Filed: Aug. 17, 2010

(65) Prior Publication Data

US 2011/0033135 A1 Feb. 10, 2011

(51) Int. Cl.
*B65B 55/04* (2006.01)
*B65B 9/20* (2012.01)

(52) U.S. Cl. ............................................ 53/426; 53/451

(58) Field of Classification Search .................... 53/426, 53/451, 167, 551, 552
See application file for complete search history.

(56) References Cited

U.S. PATENT DOCUMENTS

| | | | |
|---|---|---|---|
| 3,645,992 A | 2/1972 | Elston | |
| 4,076,698 A | 2/1978 | Anderson et al. | |
| 4,503,102 A | 3/1985 | Mollison | |
| 4,521,437 A | 6/1985 | Storms | |
| 4,937,299 A | 6/1990 | Ewen et al. | |
| 5,206,075 A | 4/1993 | Hodgson, Jr. | |
| 5,364,486 A | 11/1994 | Falla et al. | |
| 5,453,318 A | 9/1995 | Giacobbe | |
| 5,508,051 A | 4/1996 | Falla et al. | |
| 5,629,059 A * | 5/1997 | Desai et al. | 428/34.9 |
| 5,721,025 A | 2/1998 | Falla et al. | |
| 5,804,620 A | 9/1998 | Amos | |
| 5,879,768 A | 3/1999 | Falla et al. | |
| 5,911,665 A * | 6/1999 | Heydarpour et al. | 53/449 |
| 5,942,579 A | 8/1999 | Falla et al. | |
| 5,972,443 A | 10/1999 | Breck et al. | |
| 5,972,486 A | 10/1999 | Cometto et al. | |
| 6,010,772 A | 1/2000 | Perdomi et al. | |
| 6,015,854 A | 1/2000 | McCullough, Jr. | |
| 6,117,465 A | 9/2000 | Falla | |
| 6,159,587 A | 12/2000 | Perdomi | |
| 6,172,172 B1 | 1/2001 | Burgin et al. | |

(Continued)

FOREIGN PATENT DOCUMENTS

CA    2231449    4/1997

(Continued)

OTHER PUBLICATIONS

Wild, et al., Journal of Polymer Science, Poly. Phys. Ed., vol. 20, Determination of Branching Distributions in Polyethylene and Ethylene Copolymers, 1982, pp. 441-455.

(Continued)

*Primary Examiner* — Stephen F Gerrity
(74) *Attorney, Agent, or Firm* — Potter Anderson Corporation LLP; Rakesh H. Mehta, Esq.

(57) ABSTRACT

This invention relates to blends of polyethylene and polypropylene useful to make films for packaging of flowable materials, in particular liquids. In addition to possessing good flex crack resistance, these films can withstand steam sterilization and/or aseptic packaging conditions as they have Hot Tack Initiation Temperatures in the range of from about 100° C. to about 140° C. and Hot Tack Strengths of not more than 5 N/inch in the temperature range from 100° C. to 150° C.

18 Claims, 13 Drawing Sheets

U.S. PATENT DOCUMENTS

| | | | |
|---|---|---|---|
| 6,221,470 B1 | 4/2001 | Ciocca et al. | |
| 6,256,966 B1 | 7/2001 | Braun et al. | |
| 6,406,765 B1 | 6/2002 | Braun et al. | |
| 6,416,833 B1 | 7/2002 | Climenhage et al. | |
| 6,430,898 B1 * | 8/2002 | Remmers et al. | 53/440 |
| 6,767,599 B2 | 7/2004 | Braun et al. | |
| 2001/0028929 A1 * | 10/2001 | Breck et al. | 428/35.5 |
| 2002/0006482 A1 | 1/2002 | Falla et al. | |
| 2003/0049479 A1 * | 3/2003 | Quintin et al. | 53/551 |
| 2004/0051189 A1 | 3/2004 | Meier et al. | |
| 2005/0106344 A1 | 5/2005 | Morris et al. | |
| 2007/0269623 A1 * | 11/2007 | Breck | 428/35.5 |
| 2010/0292407 A1 * | 11/2010 | Jacobsen et al. | 525/240 |
| 2011/0033644 A1 * | 2/2011 | Breck et al. | 53/426 |

FOREIGN PATENT DOCUMENTS

| | | |
|---|---|---|
| CA | 2239579 | 6/1997 |
| CA | 2512041 | 8/2004 |
| CA | 2526873 | 12/2004 |
| EP | 1391295 | 2/2004 |
| WO | WO95/26268 | 10/1995 |
| WO | WO01/53079 | 7/2001 |

OTHER PUBLICATIONS

J.C. Randall, "Sequence Distributions versus Catalyst Site Behaviour of in Situ Blends of Polypropylene and Poly (ethylene-co-propylene)", Journal of Polymer Science: Part A: 1998, pp. 1527-1542.

Lewis, F.C., "Form-Fill-Seal", Packaging Encyclopedia, pp. 185-188, 1987.

International Search Report from PCT/CA2007/001563 dated Dec. 13, 2007 3 pages.

* cited by examiner

Films made from Comparative Ex. 1 shown severe deformation and fracture after steaming Films made from Ex. 2 shown no deformation or fracture after steaming Comparative Photographs of steamed 3-Ply bags with the same PE/metPET/PE outer ply and with different liner plies (middle and inner plies)

Comparative Photographs of steamed 3-Ply bags with the same PE/metPET/PE outer ply and with different liner plies (middle and inner plies)

POUCH MAKING PROCESS INCLUDING USE OF LIQUID PACKAGING FILMS OF POLYETHYLENE AND POLYPROPYLENE BLENDS

CROSS-REFERENCE TO RELATED APPLICATION

This application is filed under the provisions of 35 U.S.C. §121 and claims priority to U.S. patent application No. 11/899,244, filed on Sep. 5, 2007, which in turn claims priority to the United States Provisional Patent Application No. 60/842,221, filed on Sep. 5, 2006. Both applications are incorporated herein in their entirety.

FIELD OF THE INVENTION

This invention relates to blends of polyethylene and polypropylene useful to make films for packaging of flowable materials, in particular liquids. In addition to possessing good flex crack resistance, these films can withstand steam sterilization and/or aseptic packaging conditions as they have Hot Tack Initiation Temperatures in the range of from about 100° C. to about 140° C. and Hot Tack Strengths of not more than 5 N/inch in the temperature range from 100° C. to 150° C.

BACKGROUND

Polyolefin films, which are used to package liquids, must be very tough and the edges must bond together very strongly in a bag or pouch. Examples of such films can be found in U.S. Pat. Nos. 4,503,102; 4,521,437; 5,972,443; 6,256,966; 6,406,765; 6,416,833 and 6,767,599. A number of patents held by Dow in this area include U.S. Pat. Nos. 5,364,486; 5,508,051; 5,721,025; 5,879,768; 5,942,579; and 6,117,465. All of these patents describe various polymer blends which are used to manufacture flexible packages such as those described herein. An Exxon Mobil patent in this area is U.S. Pat. No. 5,206,075. The disclosures of all of these documents are incorporated herein by reference Flex crack resistance is an extremely important property for films used in bags and pouches that are used to package flowable materials, particularly liquids, and most particularly for lower viscosity liquids like water, milk, juices, concentrates, purees and the like. These liquids can slosh around considerably during handling, transportation and distribution of filled packages, causing flexing of the film and flex cracking of film materials.

Flex cracking is caused by the movement of the liquid within the pouch or bag, and is most likely to happen where the film is in close proximity to the upper surface of the liquid. Flex cracking can occur during shipping and handling of large bulk bags to the smallest fluid-containing pouches. Flex crack pinholes result in at least, loss of oxygen and moisture barrier, reducing the shelf life potential of the packaged product, and in more extreme cases, loss of the hermetic seal, rendering the product unsafe for consumption. Flex crack resistance is measured by Gelbo Flex Testing according to ASTM F392. Generally, a film with good flex crack resistance will develop no or very few pinholes when flexed for a large number of cycles with the Gelbo flex tester.

Thermal resistance of films is an important factor in aseptic packaging, in particular for aseptic steam sterilization filling processes for bags and pouches. Bags made from films with low thermal resistance tend to exhibit wrinkling or so called "Crocodile Skin" on the exterior of the bag after steam sterilization, resulting in poor aesthetics and bag properties. This wrinkling can often be accompanied by the inner and outer plies of a multiply bag sticking together, or even a bag or pouch made from a monolayer film sticking to itself. In a typical steam sterilization process for aseptic filling of liquid foods, the bag is first placed into a drum or bin and the fitment is then secured onto the fill head of the filling machine. Before the fitment on the bag is opened, the fitment (or spout) assembly is subjected to a steam flush ranging from 3 to 60 seconds. The fitment is then opened, and the product is pumped into the bag. At this stage, steam can enter the bag. Residual steam in the fill head keeps the temperature at about saturated steam conditions. Once the bag has been filled with product, a steam flush is employed before, or while the fitment is being closed. This post-fill steam flush can typically last from 2 to 8½ seconds. During this step, steam often enters the bag. The higher the steam temperature used in these filling operations, the greater the chance of wrinkling of the bag and hence the need for a more thermally resistant film for the bag.

Films with inadequate thermal resistance may stretch and deform unacceptably in close proximity to heated machine parts such as sealing jaws found in form, fill and seal machines. The stretched or deformed area of the film may become the weak point of the pouch or bag, at which it will fail prematurely in subsequent shipping and handling.

The sterilization cycle for aseptic form, fill, and seal pouch machines commonly uses steam at temperatures above 100° C. for sterilizing the fill tubes. Films used to produce pouches, which have polyethylene inner layers, cannot withstand these temperatures and stick to the fill tubes. To eliminate sticking of the production film, a special thermally resistant leader film must be used during the sterilization cycle. The films of this invention offer more thermal resistance and the potential to eliminate special leader films.

Other film applications also require good thermal resistance, such as hot-fill applications. In this type of operation, the product is hot as it is pumped into the bag or pouch—typically from 77 to 96° C. The heat from the product serves to sterilize the inside of the bag or pouch and fitment. The bag or pouch, once filled, slides down along an inclined chute and is flipped so that the fitment is facing down (with hot product above it). The bag or pouch then passes through a long heating tunnel for several minutes which is maintained at roughly the same temperature as the product fill temperature to keep the contents hot and to kill mold and bacteria. The bag or pouch subsequently enters and passes through a long cooling tunnel to cool down to almost room temperature. Films used in such bags or pouches require good thermal resistance so that the films and the seals maintain their integrity while in contact with the hot product.

Thermal resistance of films is assessed in a number of ways. Generally, Hot Tack Initiation Temperature and Hot Tack Strength are the primary indicators of a film's thermal resistance. Hot Tack is the strength of the molten seal immediately after sealing before it has cooled down to ambient temperature and achieved its final strength. Hot Tack Initiation Temperature is the minimum temperature at which 2N/inch of Hot Tack Strength is achieved in the Hot Tack Test as described below. The Hot Tack Initiation Temperature, sometimes referred to as Seal Initiation Temperature, is the minimum temperature required to form a molten seal of significant strength. It generally cools to form a low strength seal that can be peeled apart without stretching or distorting the film. This property allows the prediction of molten seal strength and resistance to thermal deformation (wrinkling) and/or sticking.

Prior art patent and non-patent literature contains numerous disclosures, which claim to compatibilize polyethylene and polypropylene in a functional way. In this regard, reference may be had to US Patent Publication No. 2002/0006482 which contains an extensive review of the patent and literature publications in this area. However, to date no adequate direction has been provided to the packaging art, in particular the liquid packaging art, as to how to select a suitable subset of polypropylenes that can be used in combination with polyethylene to form functional liquid packages, which meet all of the industry criteria.

SUMMARY OF THE INVENTION

There has long been a desire in the packaging industry to combine the beneficial properties of polyethylene and polypropylene. Polyethylene alone is tough and has good low temperature sealing properties, but it lacks thermal resistance especially when flex crack resistance is optimized. Surprisingly, we have identified certain film blend compositions in which a heterogeneous polypropylene can be blended with a polyethylene to improve the thermal resistance relative to polyethylene alone, while, at the same time, improving rather than degrading its flex crack resistance.

There is disclosed a flowable material packaging film comprising at least a resin blend of (a) from about 33 wt % to about 80 wt % of at least one ethylene-$C_4$ to $C_{10}$-alpha-olefin interpolymer having a melt index of from 0.4 to 1.5 g/10 min (190° C., 2.15 kg), a density of from 0.900 to 0.916 g/cc; and (b) from about 67 wt % to about 20 wt % of at least one heterogeneous interpolymer of propylene with ethylene or ethylene and butene comprising from about 71 mol % to about 86 mol % propylene and from about 29 mol % to about 14 mol % ethylene or ethylene and butene, the interpolymer having an overall weight average molecular weight ($M_w$) of at least about 400,000, a xylene soluble phase of not less than 30% (wt), with the xylene soluble phase having a $M_w$ of at least about 275,000 and said heterogeneous interpolymer of polypropylene has a density of from 0.875 to 0.91 g/cc; and the film has a Hot Tack Initiation Temperature in the range of from about 100° C. to about 140° C. and a Hot Tack Strength of not more than about 5 N/inch in the temperature range of about 100° C. to about 150° C., when fabricated at a thickness of about 50 microns and tested using a JB Instrument Hot Tack Tester set at a 0.5 second dwell, 0.2 second delay time, 40 psi seal bar pressure and 250 mm/second peel rate; and the film has a flex crack resistance such that it develops 5 or less pinholes per 300 $cm^2$ in 10,000 cycles of Gelbo Flex testing as measured according to ASTM F392. The film exhibits flex crack resistance and thus is useful in the manufacture of pouches and bags made from such films. Processes for making such pouches and bags which may include aseptic conditions are also described.

Figure 1:
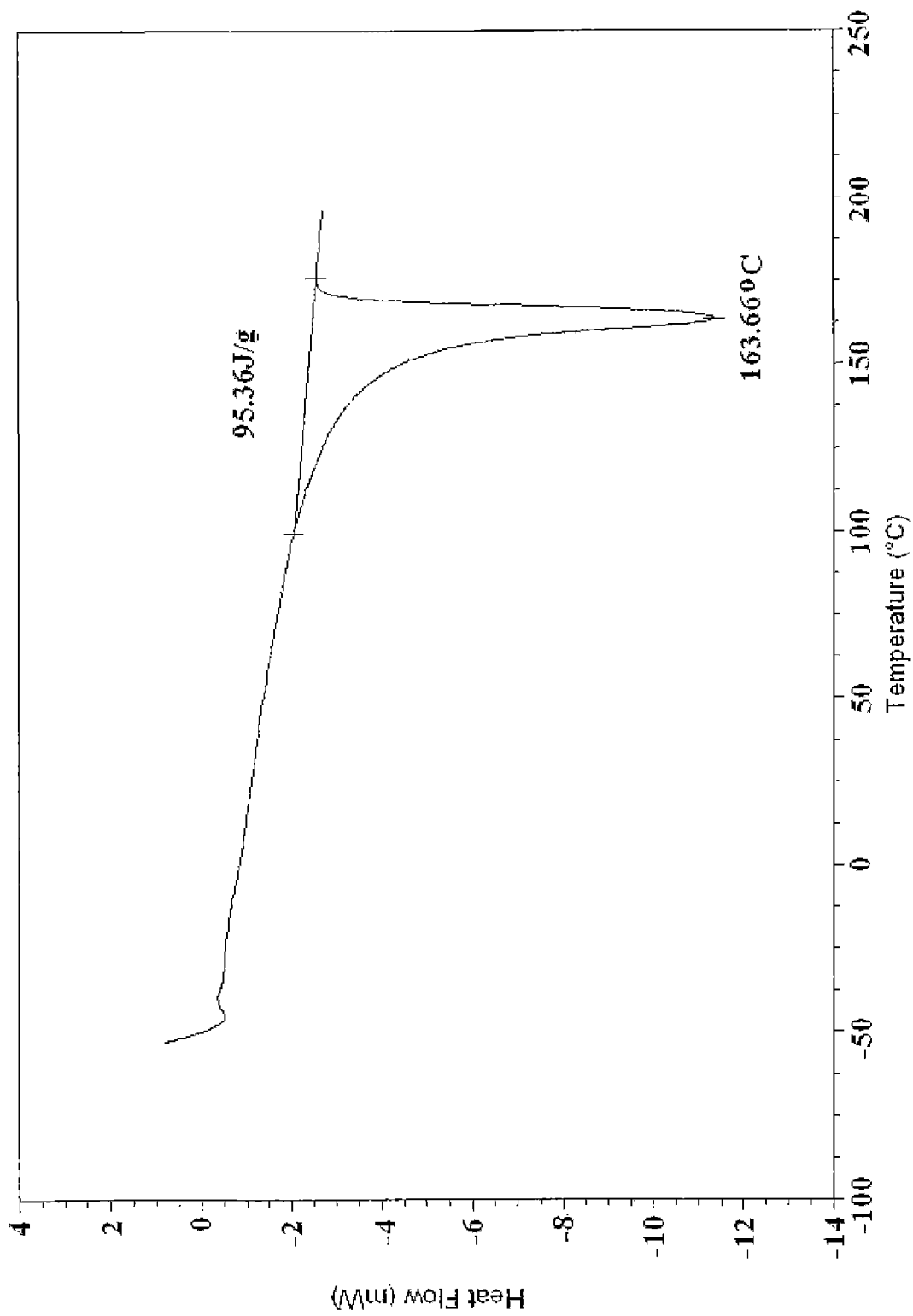
FIG. 1 is a DSC melting curve for isotactic polypropylene homopolymer.

The present invention provides in one aspect a liquid packaging film comprising at least a resin blend of (a) from about 33 wt % to about 80 wt % of at least one ethylene-$C_4$ to $C_{10}$-α-olefin interpolymer having a melt index of from 0.4 to 1.5 g/10 min (190° C., 2.16 kg), a density of from 0.900 to 0.916 g/cc; and (b) from about 67 wt % to about 20 wt % of at least one heterogeneous interpolymer of propylene with ethylene or ethylene and butene comprising from about 71 mol % to about 86 mol % propylene and from about 29 mol % to about 14 mol % ethylene or ethylene and butene, the interpolymer having an overall weight average molecular weight ($M_w$) of at least about 400,000, a xylene soluble phase of not less than 30% (wt), with the xylene soluble phase having a $M_w$ of at least about 275,000 and said heterogeneous interpolymer of polypropylene has a density of from 0.875 to 0.91 g/cc; and the film has a Hot Tack Initiation Temperature in the range of from about 100° C. to about 140° C. and a Hot Tack Strength of not more than about 5 N/inch in the range of from about 100° C. to about 150° C., when fabricated at a thickness of about 50 microns and tested using a JB Instrument Hot Tack Tester set at a 0.5 second dwell, 0.2 second delay time, 40 psi seal bar pressure and 250 mm/second peel rate; and the film has a flex crack resistance such that it develops 5 or less pinholes per 300 $cm^2$ in 10,000 cycles of Gelbo Flex testing as measured according to ASTM F392.

The resin blend preferably contains about (a) 33 wt % to about 75 wt % of the at least one ethylene-$C_4$ to $C_{10}$-α-olefin interpolymer and (b) from about 67 wt % to about 25 wt % of the at least one heterogeneous interpolymer of propylene with ethylene or ethylene and butene.

Most preferably, the resin blend contains about (a) 50 wt % to about 75 wt % of the at least one ethylene-$C_4$ to $C_{10}$-α-olefin interpolymer and (b) from about 50 wt % to about 25 wt % of the at least one heterogeneous interpolymer of propylene with ethylene or ethylene and butene.

DETAILED DESCRIPTION OF THE INVENTION

Ethylene-$C_4$ to $C_{10}$-α-olefin Interpolymer

The ethylene-$C_4$ to $C_{10}$-α-olefin interpolymer having a melt index of from 0.4 to 1.5 g/10 min (190° C., 2.16 kg), a density of from 0.900 to 0.916 g/cc may be a single polymer, or a blend of two polymers, or even several individual polymer grades. Interpolymer encompasses copolymers, terpolymers, and the like. This interpolymer may be selected from linear low density polyethylenes (LLDPEs). Using industry convention, linear low density polyethylenes in the density range 0.915-0.930 g/cc will be referred to as LLDPEs and in the density range 0.900-0.915 g/cc will be referred to as ultra-low density polyethylenes (ULDPEs) or very low density polyethylenes (VLDPEs).

Heterogeneously branched ULDPE and LLDPE are well known among practitioners of the linear polyethylene art. They are prepared using Ziegler-Natta solution, slurry or gas phase polymerization processes and coordination metal catalysts as described, for example, by Anderson et al. in U.S. Pat. No. 4,076,698, the disclosure of which is incorporated herein by reference. These Ziegler-type linear polyethylenes are not homogeneously branched and they do not have any long-chain branching. At a density less than 0.90 g/cc, these materials are very difficult to prepare using conventional Ziegler-Natta catalysis and are also very difficult to pelletize. The pellets are tacky and tend to clump together. Commercial examples of these polymers are sold by Dow Chemical under the trade-marks "Dowlex" and "Attane", by Nova Chemical under the trade-mark "Sclair" and by Huntsman Chemical under the trade-mark "Rexell".

Homogeneously branched ULDPEs and LLDPEs are also well known among practitioners of the linear polyethylene art. See, for example, Elston's U.S. Pat. No. 3,645,992. They can be prepared in solution, slurry or gas phase processes using single site catalyst systems. For example, Ewen, et al., in U.S. Pat. No. 4,937,299, describe a method of preparation using a metallocene version of a single site catalyst. The disclosures of Elston and Ewen are incorporated herein by reference. Commercial examples of these polymers are sold commercially by ExxonMobil Chemical under the trade-mark "Exact" and by Dow Chemical under the trade-mark "Affinity" and by Nova Chemical under the trade-mark "Surpass".

The term "homogeneously branched" is defined herein to mean that (1) the α-olefin monomer is randomly distributed within a given molecule, (2) substantially all of the interpolymer molecules have the same ethylene-to-α-olefin monomer ratio, and (3) the interpolymer has a narrow short chain branching distribution. The short chain branching distribution index (SCBDI) is defined as the weight percent of the polymer molecules having a comonomer content within 50 percent of the median total molar comonomer content. The short chain branching distribution index of polyolefins that are crystallizable from solutions can be determined by well-known temperature rising elution fractionation techniques, such as those described by Wild, et al., Journal of Polymer Science, Poly. Phys. Ed., Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or U.S. Pat. No. 4,798,081.

Suitable $C_4$-$C_{10}$ α-olefins for inclusion in the linear low density polyethylenes of the present invention may be 1-octene, 1-hexene, 1-butene, or mixtures thereof, most preferably the α-olefin is 1-octene.

Heterogeneous Polypropylene Interpolymer

Isotactic polypropylene homopolymer is a homogeneous polymer normally polymerized in a single stage reaction. It has a single clean DSC melting peak in the region 160-165° C. as illustrated in FIG. 1 of the accompanying drawings.

Figure 2:
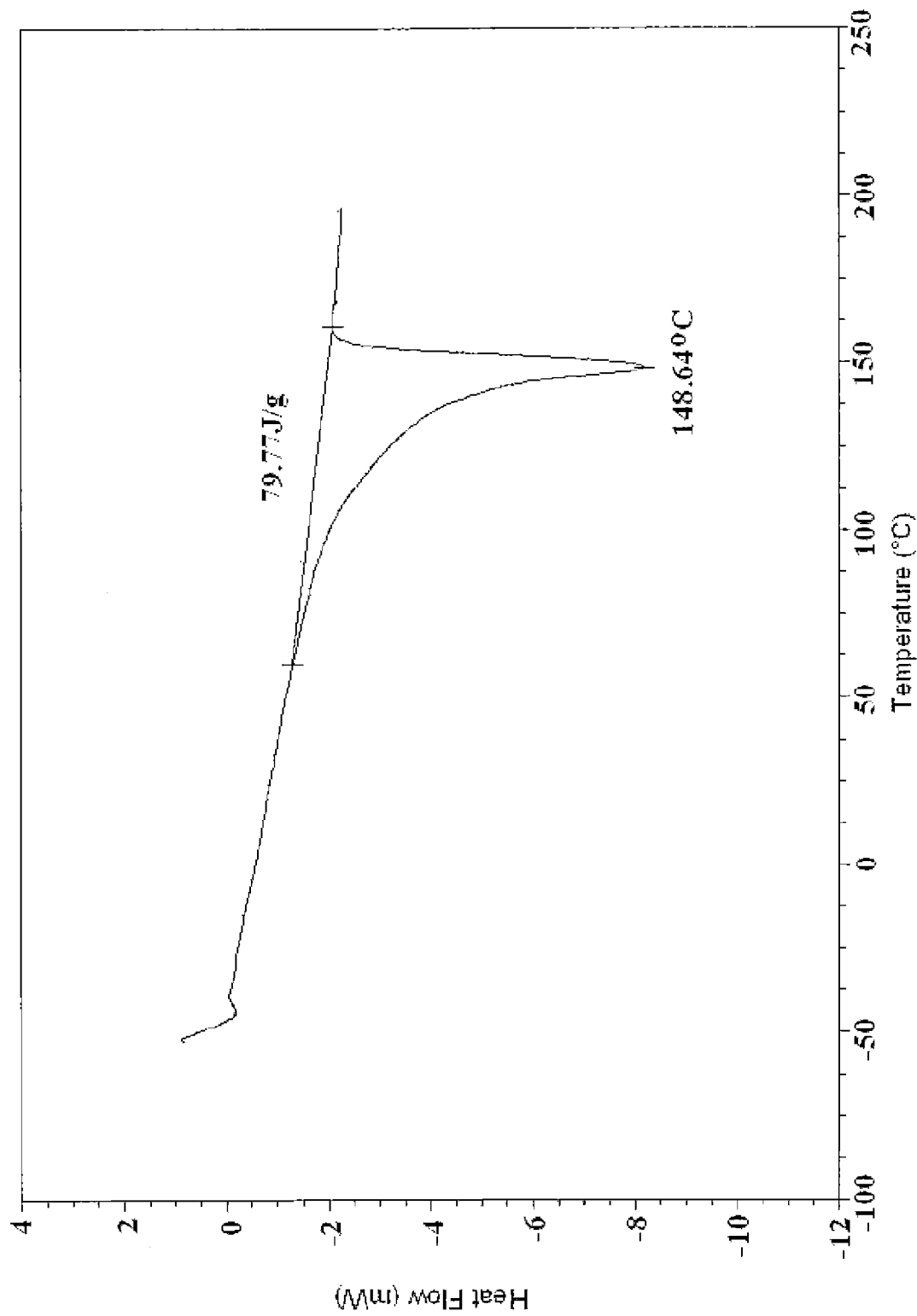
FIG. 2 is a DSC melting curve for a typical homogeneous polypropylene interpolymer.

Homogeneous polypropylene interpolymers also consist of a single phase, and have a single clean DSC melting peak, which occurs at a lower temperature than that of the homopolymer. The energy of melting of the homogeneous interpolymer is also somewhat lower than that of the homopolymer. A typical DSC melting curve for a homogeneous propylene-ethylene interpolymer is illustrated in FIG. 2 of the accompanying drawings.

Heterogeneous polypropylene interpolymers are formed in a two stage reaction. In the first stage, a crystalline network of isotactic polypropylene homopolymer or homogeneous polypropylene interpolymer is formed. In the second stage, a largely amorphous rubbery phase is formed within the crystalline network. A portion of the polymer formed in the second stage reaction is normally rich enough in comonomer to be able to crystallize to form a third phase. When the comonomer is ethylene, the third phase normally has a DSC melting peak in the 120-125° C. region as illustrated in FIG. 3 of the accompanying drawings.

The resin blend of the invention includes heterogeneous polypropylene interpolymers, rather than isotactic polypropylene homopolymers or homogeneous polypropylene interpolymers. Furthermore, the second stage of the polymerization process used to produce the heterogeneous polypropylene interpolymer must be extremely efficient in producing amorphous rubbery polymer to the extent that almost no crystalline third phase is produced.

Figure 3:
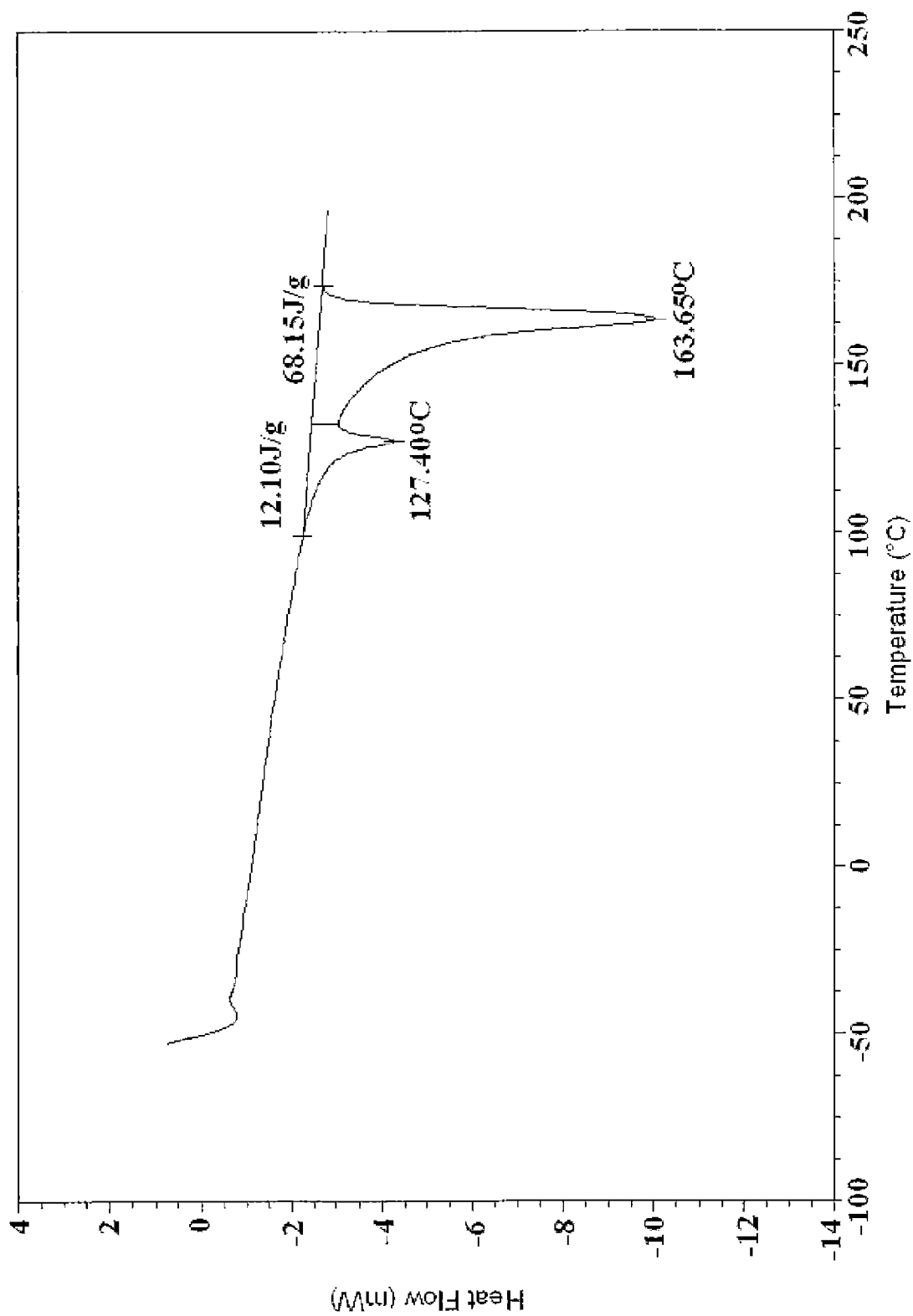
FIG. 3 is a DSC melting curve for a typical heterogeneous polypropylene interpolymer.
Figure 6:
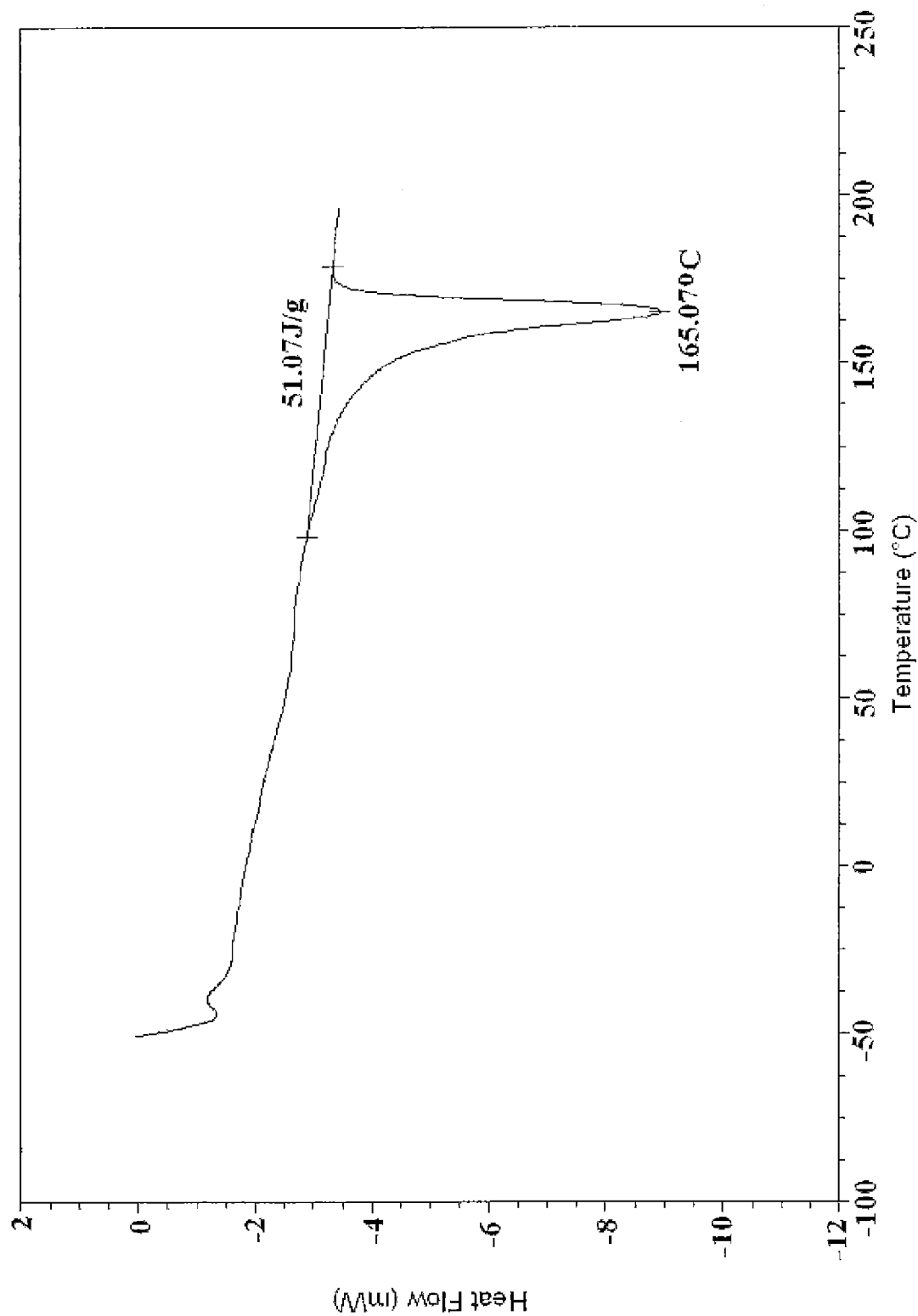
FIG. 6 is a DSC melting curve for a heterogeneous polypropylene interpolymer used in the resin blend of the present invention.

As a result, the DSC melting curves for these special heterogeneous polypropylene interpolymers (FIG. 6) are quite different from those for typical heterogeneous polypropylene interpolymers (FIG. 3). The low temperature peak is almost completely absent, making the curve look more like that for a homopolymer or homogeneous interpolymer (FIGS. 1 and 2). However, the energy of melting for the heterogeneous polypropylene interpolymer used in the present blend is lower than that of either the homopolymer or the homogeneous copolymer. A slight shoulder may be observable in the temperature region 120-125° C.

The propylene concentration in any polypropylene interpolymer can be measured using the NMR spectroscopy method, which is subsequently described. The amorphous fraction of a polypropylene interpolymer can be estimated by measuring the xylene soluble fraction of that polymer using the xylene extraction method described herein.

Figure 4:
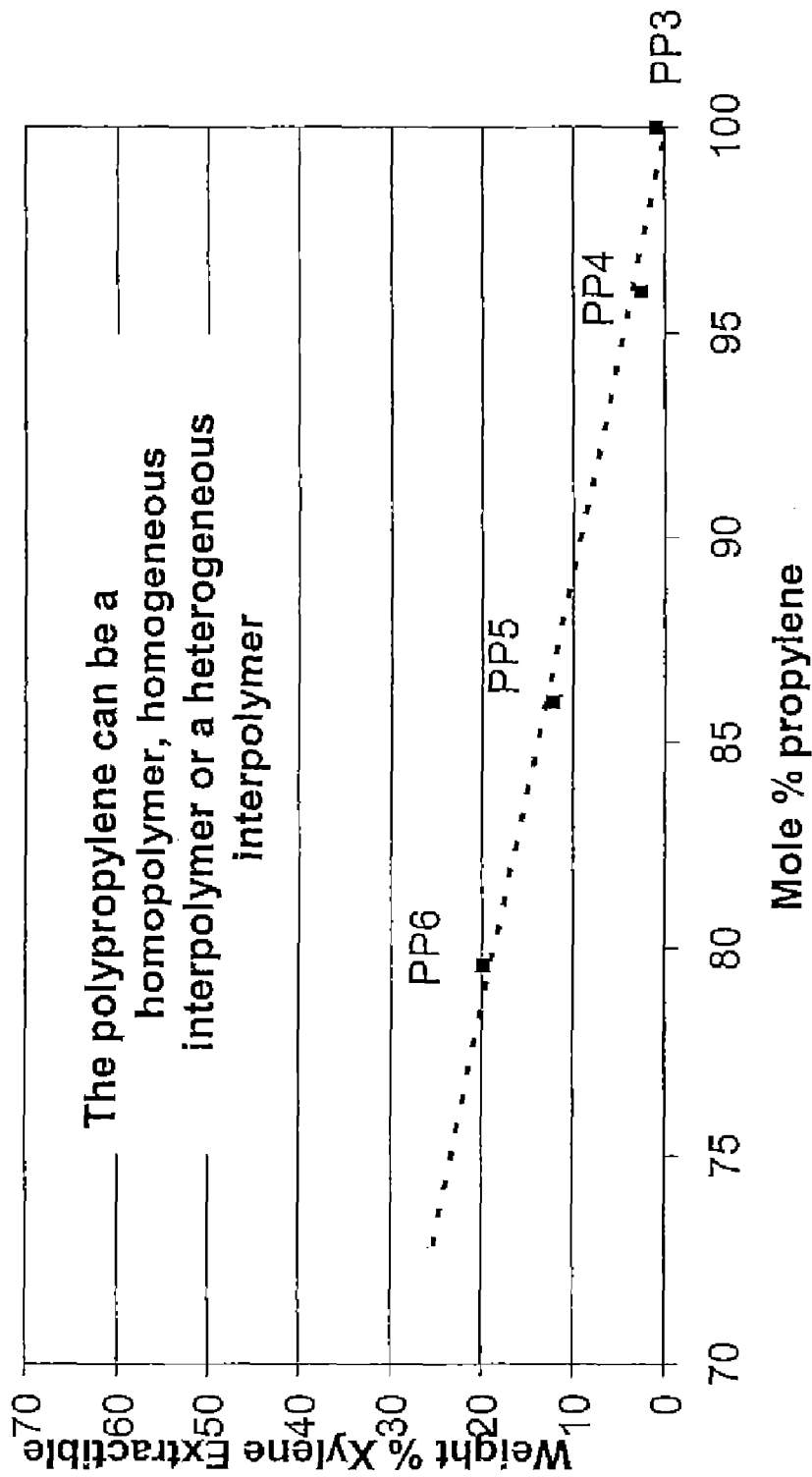
FIG. 4 is a graph that plots the weight percent of the amorphous content of polypropylene interpolymers as a function of propylene content (general)
Figure 5:
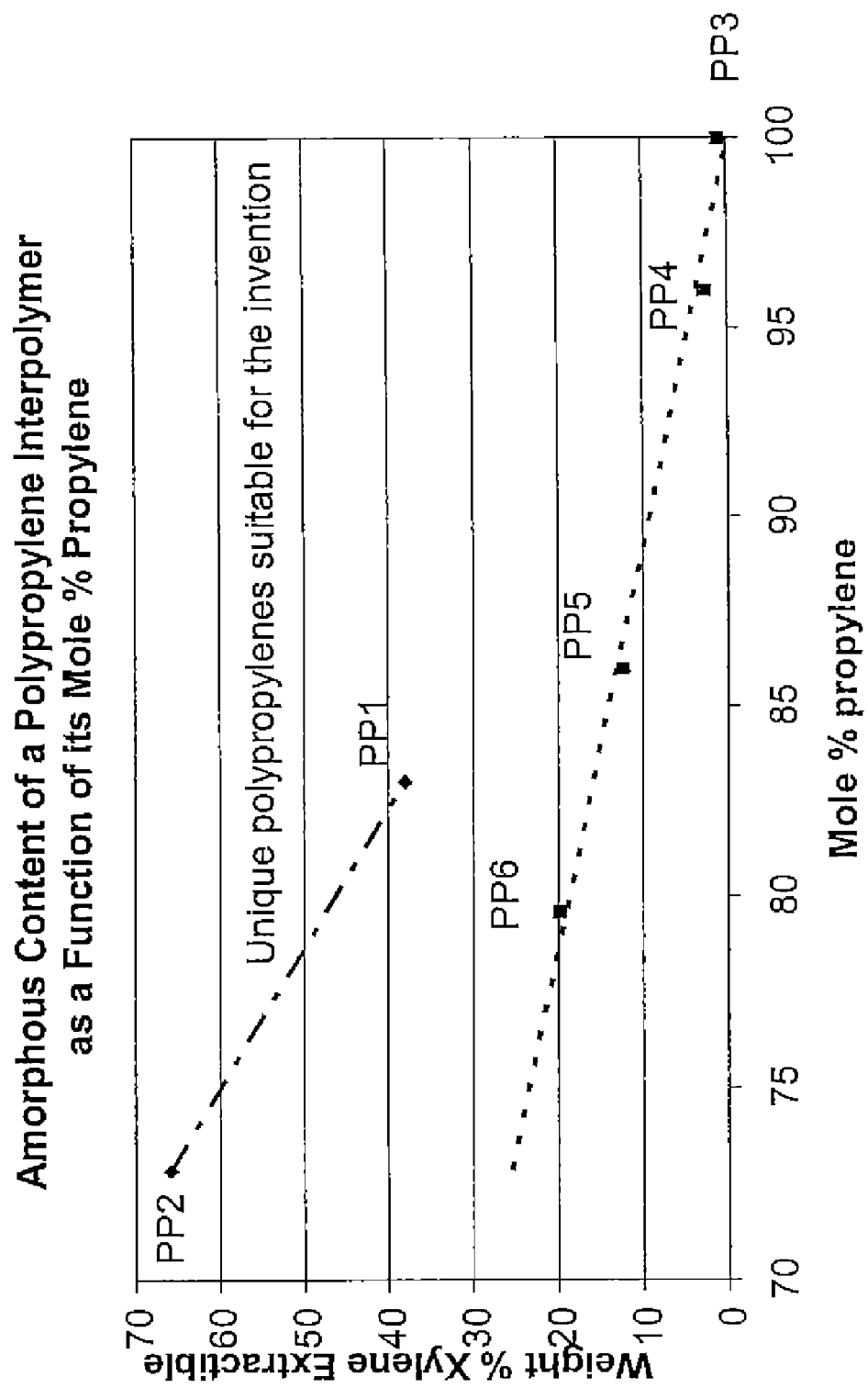
FIG. 5 is a graph that plots the weight % amorphous content in polypropylene interpolymers as a function of propylene content (general plus polypropylene interpolymers are used in this invention)

As can be seen in FIG. 4, there is a predictable linear relationship between the amorphous content of a typical polypropylene interpolymer, either homogeneous or heterogeneous, and its polypropylene concentration. Table 2 and FIG. 5 both show that the unique heterogeneous polypropylene interpolymers used in this invention (for example, PP1 and PP2) contain a much higher amorphous fraction, at a given propylene concentration, than do polypropylene interpolymers in general.

Molecular weight can be used to further distinguish the unique polypropylene interpolymers used in this invention. The overall molecular weight distribution of a polypropylene interpolymer, as well as the molecular weight distributions within the amorphous and crystalline fractions, can be determined using the method subsequently described. The comparative data included in this patent is for Weight Average Molecular Weight $M_w$. It is generally understood that polypropylene interpolymers with a higher overall $M_w$ will be tougher than polypropylene interpolymers with a lower overall $M_w$. However, it is also important for the unique polypropylene interpolymers used in this invention to have a relatively high $M_w$ in the amorphous fraction.

Suppliers of heterogeneous polypropylene interpolymers useful in the present blends include Basell, Borealis, Total Petrochemicals (formerly Atofina Petrochemicals), Dow Chemical and Huntsman Chemical.

Alternatives to any of these commercially available products would be selectable by a person skilled in the art for the present purposes. The resin blend defined above is selected to ensure that the resulting film has the characteristics defined. Other components, as subsequently described may be added to the blend as long as they do not negatively impact on the desired characteristics of the film of the invention.

The Hot Tack Initiation Temperature is defined as the minimum temperature required to reach a 2 N/inch Hot Tack Strength. A Hot Tack Initiation Temperature in the range of from about 100° C. to about 140° C. and a Hot Tack Strength of not more than about 5 N/inch in the temperature range of about 100° C. to about 150° C. are specified to ensure that the film will have an acceptable thermal dimensional stability during hot fill and/or stream sterilization processes and that the film has sufficient heat sealability when used as a sealant layer for a bag or pouch product. Films having too low a Hot Tack Initiation Temperature and/or too high a Hot Tack Strength will lead to poor thermal dimensional stability as shown by the so-called "crocodile skin" caused during the steam sterilization of such films. Films having too low a Hot Tack Strength and/or too high a Hot Tack Initiation Temperature are subject to weak sealability as is evident when the films are used in typical form, film, seal and bag making processes.

In another aspect of the invention, the Hot Tack Strength is from about 1 to about 5 N/inch at a temperature in the range of from about 100° C. to about 150° C.

The present blends may include additional components as processing aids, anti-oxidation agents, UV light stabilizers, pigments, fillers, compatibilizers or coupling agents and other additives which do not affect the essential features of the invention. They may be selected from processing masterbatches, colorant masterbatches, at least one low density ethylene homopolymer, copolymer or interpolymer which is different from component (a) of the present blend, at least one polymer selected from the group comprising EVA, EMA, EAA, at least one polypropylene homopolymer or polypropylene interpolymer different from component (b) of the present blend. The additional components may be present in the range of from 0 to about 30 wt %, or preferably from 3 to 30 wt % depending on the intended packaging application and the polymers involved. The processing additives generally referred to as "masterbatches" comprise special formulations that can be obtained commercially for various processing purposes. In the present instance, the processing additives are selected from combinations of slip agents, anti-block agents, colourants and processing aids. Typical processing additive masterbatches may comprise 1-5 weight % erucamide slip agent, 10-50 weight % silica anti-block, 1-5 weight % fluoropolymer process aid, and combinations of two or three of these additives.

Other aspects of the invention include pouches and bags for containing flowable materials made from the above films. The bags may be irradiated prior to use in accordance with standard procedures well known in the packaging art. As part of the pouch manufacturing process, the film may be irradiated in known ways that the person skilled in the art could readily employ. Aseptic packaging is also encompassed for both pouches and bags of all types. Also envisaged are improved pouch and bag making processes using such films.

Films from the resin compositions of this invention can be made using film extrusion processes which are well-known to the film manufacturing industry. Examples include a mono extruder based film blowing or casting process with air cooling or other cooling media. The melt processing temperature may range from 150° C. to 260° C. For a blown film process, the film blow-up-ratio (BUR) may range from 1.5 to 2.8 to have a stable process and good film quality. Processing additives (as described earlier) can be incorporated into the resins as supplied or otherwise dry blended in the form of additive concentrates or melt-compounded into the resins via melt compounding processes.

The resin composition can form one or more layers of a multilayer coextruded film made in a blowing or casting process. Films of the resin composition can be also be combined with other layers in processes such as adhesive lamination, thermal lamination, extrusion lamination, extrusion coating and the like.

For example, multilayer films can contain an oxygen barrier layer such as metallized polyester, metallized nylon, foil, biaxially oriented EVOH, etc. in combination with the films made from the present invention.

The films of this invention may be used on their own as monofilms or as a layer in multilayer films for making bags and pouches. Multiply bags or pouches can be made which incorporate at least one film ply that is a monofilm or multilayer film of the invention. The monofilm produced may have a film thickness of from about 20 to about 150 microns. Preferably, the monofilm thickness may range from about 25 to about 140 microns and more preferably from about 30 to about 125 microns. Multi-layer films may be produced using the film, generally having thicknesses in the same ranges.

Monolayer films are normally used for making pouches, which require moisture barrier but not high oxygen barrier. The inner plies of multi-ply bags, which are added to improve shipping and handling performance, are normally monofilms. Multi-layer films are used to make pouches or bags, which need a more sophisticated combination of properties, for example, higher barrier to oxygen. The outer ply of a multi-ply bag is often a multi-layer film. The middle or inner ply may also be a multi-layer film, and is often of different composition than the outer ply.

In multi-layer polymeric film, the layers generally adhere to each other over the entire contact surface, either because the polymer layers inherently stick to each other or because an intermediate layer of a suitable adhesive is used. The plies in a multi-ply bag or pouch do not adhere to each other except at the edges of the bag or pouch in the heat seals, or in the fitment area.

The bags which may be produced from the films of the invention are pre-made and then usually filled with food through a fitment. They are often sterilized and may be, for example, irradiated in a batch process, employing standard radiation conditions known in the art. The film may also be sterilized rather than the bags. Sterilization can be achieved in a variety of known ways such as by exposure of the film or bag to hydrogen peroxide solution. The films used to make pouches may be similarly treated prior to package formation. Of importance is that the films and bags can endure aseptic packaging conditions.

The capacity of the bags or pouches made from the composition of the present invention may vary considerably. Typically, bags can be sized from 2 to 400 gallons. Typically, the pouches may contain from about 250 milliliters to about 20 liters of flowable material.

The bags or pouches using the resin blend compositions of the present invention can also be surface treated and then printed by using techniques known in the art, e.g., use of corona treatment before printing.

By flowable materials is meant materials which are flowable under gravity or which may be pumped. Normally such materials are not gaseous. Food products or ingredients in liquid, powder, paste, oils, granular or the like forms are envisaged, of varying viscosity are envisaged. Materials used in manufacturing and medicine are also considered to fall within such materials. Liquids are considered to be the materials that benefit especially from packaging in accordance with the present invention.

Bag Making

Generally, the invention provides an improved bag making process comprising the steps of providing a multi-ply film structure, having inner and outer plies, wherein at least one of the plies is a film of the invention, securing a spout to inner and outer plies of the film structure through a hole provided therein, sealing the plies together transversely across the width of the multi-ply film structure, to form a top seal of one bag and a bottom seal of the bag and a top seal of an adjacent bag, then sealing the plies together parallel to the length of the bag line are applied at either side of the films, and trapped air being removed prior to completely sealing the bag, and separating the bags immediately or just prior to use.

Figure 12:
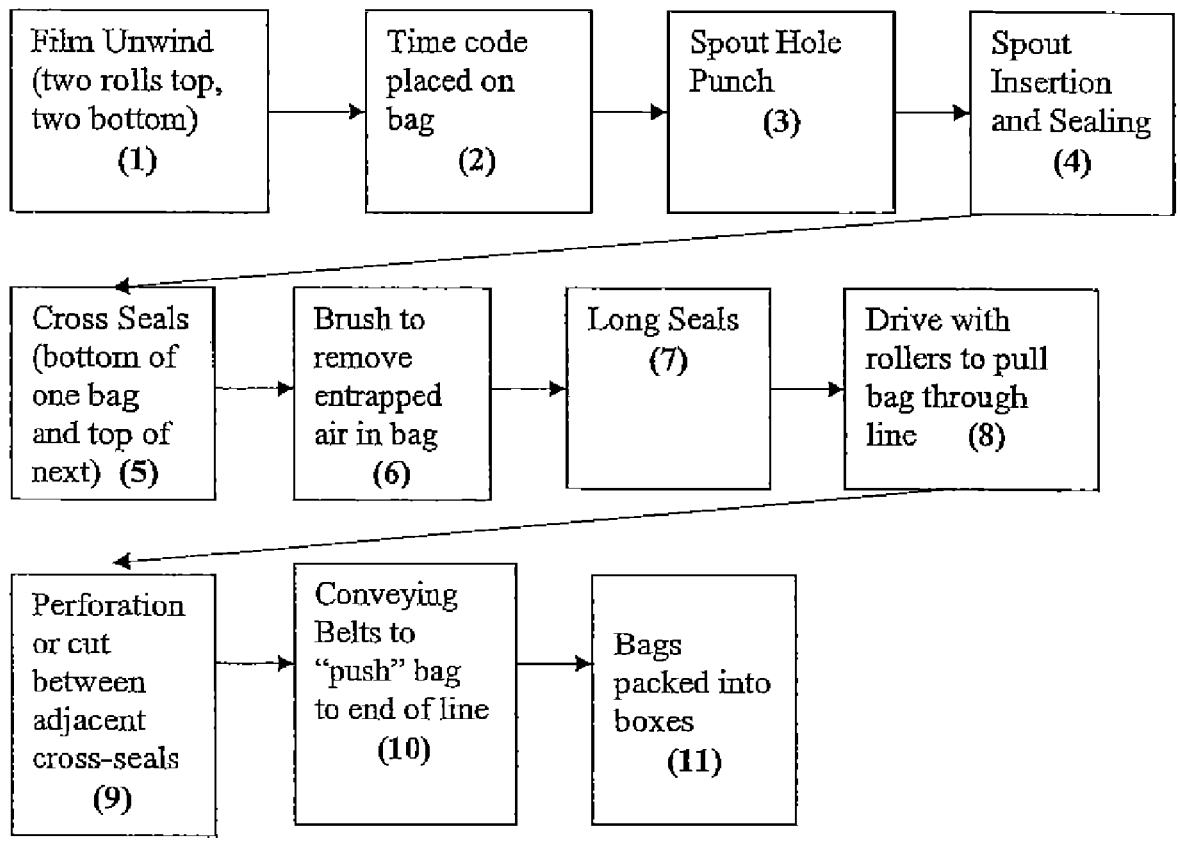
FIG. 12 is a block diagram of a typical process that may be used to produce beverage bags using a film of the invention.

Referring now to FIG. 12, of the accompanying drawings, bag-making is exemplified by a line to make two-ply beverage bags with a spout. Four rolls of film of the same width are mounted on unwind stands (1). The two outermost rolls form the outer ply on the front and the back of the bag. These rolls are generally identical in film composition. The outer plies are usually the most complicated film layers in the bag structures. They are often laminates or coextrusions with a core layer of a barrier polymer such as nylon, polyester, or EVOH. Thin non-polymeric layers may also be included such as aluminum, aluminum oxide or silicon oxide, usually as coatings on the core layer of the laminate. The laminated core layer material is also often monaxially or biaxially oriented.

The two innermost rolls form the inner ply on the front and the back of the bag. They are generally identical in composition, and are most often monofilms or coextrusions of polyethylene.

A time code is applied to the outer surface of one of the outer plies at station (2). A hole is punched through the outer and inner plies that will form one side of the bag at station (3). At station (4), a spout, the form of which is selected from any of the standard forms known in the bag making art, is inserted through the hole, and an enlarged flange of the spout is normally heat sealed to the inner and outer film plies. At station (5), a pair of heat seals is applied across the width of the films, forming the bottom seal of one bag and the top seal of the next bag. A brush or other means for removing air trapped between the film plies is shown at station (6). The seals parallel to the length of the bag line are applied at either side of the films at station (7). Rollers, which pull the films through the bag line, are located at position (8).

At station (9), a knife or hot sealing bar may be used to completely separate the bags between the adjacent cross seals. Alternately, a sealing bar may be used to form a perforation between adjacent bags, so that they can be wound up as a continuous roll. Station (10) is a conveyor belt to push the bag, or strip of bags, to the end of the bag-making line. At the final station (11), the bags are packed into boxes. Many variations of this procedure are known and the person skilled in the art would select from those processes as necessary for the proposed application.

There are variations to this process when, for example, bulk bags are manufactured. In one variation, the long seal (along the machine-direction) can take place before the cross (transverse) seal is made. In another variation, the perforation can occur between the long and cross seal steps. These variations apply for a single spout placed on a bag. For some bags, two spouts may be inserted on each bag. In such instance, a second hole punch and spout insertion step (for the second spout) is included and usually after the hole punch and spout insertion for the first spout is concluded.

Pouch Making

Generally, the invention provides an improved pouch making process comprising the steps of providing a monofilm of the invention; forming the film into a tubular member; heat sealing longitudinal edges and then filling the pouch with flowable material; heat sealing a first transverse end of the tubular member to form a pouch; and sealing and cutting through a second transverse end of the tubular member to provide a filled pouch; the tubular member being filled continuously or intermittently; the upper transverse seal being the bottom seal of the next pouch to be formed and filled.

Figure 11:
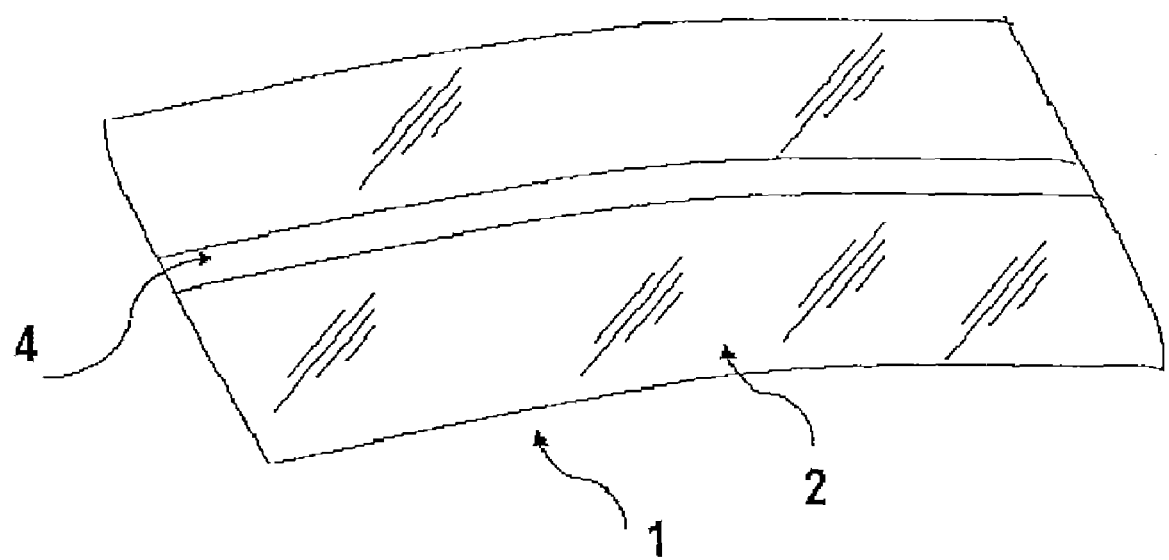
FIG. 11 is an illustration of a pouch made from a film of the invention on a vertical form, fill and seal packaging machine.

In FIG. 11 of the present invention there is illustrated a typical pouch 1 for containing liquids made using the film of the present invention. With regard to FIG. 11, there is shown a pouch 1 being a tubular member having a longitudinal lap seal 4 and transverse seals 3 such that, a "pillow-shaped" pouch 2 is formed when the pouch is filled with flowable material.

The pouch manufactured according to the present invention is generally the pouch shown in FIG. 11 made on so-called vertical form, fill and seal (VFFS) machines well known in the art. Examples of commercially available VFFS machines include those manufactured by Hayssen or Prepac. A VFFS machine is described in the following reference: F. C. Lewis, "Form-Fill-Seal," Packaging Encyclopedia, page 180, 1980, the disclosure of which is incorporated herein by reference. The process of making a pouch with a VFFS machine is generally described in U.S. Pat. Nos. 4,503,102 and 4,521,437, the disclosures of which are incorporated herein by reference.

Test Methods and Procedures

The following descriptions set out the details of the various tests used to characterize and select the resin blends for the films of the present invention.

Hot Tack Strength

Hot Tack is the strength of a heat seal immediately after sealing while still in a hot condition, i.e. before it has cooled down to ambient temperature and achieved its final strength. Hot tack strength of the present films are tested on a JB Hot Tack Tester by following ASTMF1921-98 procedures with the following setup parameters:

| Test device | JB Hot Tack Tester |
|---|---|
| Specimen Width | 25.4 mm |
| Dwell Time | 0.5 sec |
| Sealing Pressure | 0.27 N/mm² (40 psi) |
| Delay Time | 0.2 sec |
| Peel Speed | 250 mm/sec |
| No. of samples per temperature | 5 |
| Temperature Increase interval | 5° C. |

Hot Tack Initiation Temperature

Hot Tack Initiation Temperature is defined as the minimum temperature required to reach a 2 N/inch Hot Tack Strength in the Hot Tack test described herein. The temperature range selected in the test is chosen to cover the typical temperature range from industrial bag making or pouching process as well as typical steam sterilization temperatures.

Gelbo Flex Test

This test method is valuable in determining the resistance of flexible packaging materials and films to flex-formed pinhole failures. This test method does not measure any abrasion component relating to flex failure. Physical holes completely through the structure are the only failures measured by the coloured turpentine portion of this test.

The Gelbo Flex tester is set up to test in accordance with ASTM F392. This apparatus consists essentially of a 3.5" (90 mm) diameter stationary mandrel and a 3.5" movable mandrel spaced at a distance of 7" (180 mm) apart from face-to-face at the start position (that is, maximum distance) of the stroke. The sides of the film sample are taped around the circular mandrels so that it forms a hollow cylinder between them. The motion of the moving mandrel is controlled by a grooved shaft to which it is attached. The shaft is designed to give a twisting motion of 440 degrees and, at the same time, move toward the fixed mandrel to crush the film so that the facing mandrels end up 1" apart at minimum distance. The motion of the machine is reciprocal with a full cycle consisting of the forward and return stroke. The machine operates at 45 cycles per minute.

By means of this tester, specimens of flexible materials are flexed at standard atmospheric conditions (23 C and 50% relative humidity), unless otherwise specified. The number of flexing cycles can be varied depending on the flex crack resistance of the film structure being tested. A pinhole resistant film will develop very few pinholes (less than 5) when flexed for a large number of cycles (at least 10,000).

The flexing action produced by this machine consists of a twisting motion, thus, repeatedly twisting and crushing the film. Flex crack failure is determined by measuring pinholes formed in the film. These pinholes are determined by painting one side of the tested film sample (300 cm$^2$ in area) with coloured turpentine and allowing it to stain through the holes onto a white backing paper or blotter. Pinhole formation is the standard criterion presented for measuring failure, but other tests such as gas-transmission rates can be used in place of, or in addition to, the pinhole test. The results reported are the average of four repeats.

Xylene Extraction Procedure

The amorphous fraction of a polypropylene interpolymer can be estimated by measuring the xylene soluble fraction of that polymer using this extraction method:

A sample of 2.5 g of polymer is heated in 100 ml of mixed xylenes in a 250 ml round bottom flask, to reflux and the sample is dissolved. The flask is heated with stirring using a heating mantel with the top of the flask insulated. The heating mantel is then turned off and the flask is allowed to cool slowly (with the insulation in place), to room temperature, overnight. The flask and contents are weighed to determine the final solvent weight. The contents are filtered first through a 200 mesh (75 micron) stainless steel screen and then through a 200 mesh (38 micron) screen. A weighed 20 ml aliquot of filtrate is placed into 25 ml septum topped vial. The vial is placed in a heated block (80° C.) and blown down to dryness under nitrogen purge (200 ml/min). The xylene soluble fraction is calculated from the dry residue weight.

Molecular Weight Measurement

The molecular weight distributions of the relevant polymers are determined using size exclusion chromatography (SEC or GPC).

The SEC/MALS/Visc analyses are performed using a Polymer Laboratories PL210 high temperature liquid chromatograph. The solvent used is trichlorobenzene (TCB) purchased from Burdick & Jackson (B&J Brand), and used without further purification. 0.043 wt % (2.5 g in 4 l of TCB with density=1.454 g/cm$^3$ at 20° C.) butylated hydroxy toluene (BHT) is added to the mobile phase to minimize oxidative degradation. The TCB solvent passes through an on-line degasser prior to the injector compartment and the columns.

The columns are housed in an integral oven maintained at 140° C. Sample solutions are prepared in the same solvent at 5.0-7.5 mg/mL in 2 mL vials which are loosely capped and then placed in a heating block at 140° C. overnight. Vials are then crimped and re-weighed to determine the final concentration before loading onto the sample carousel. The density of the TCB at 140° C. is 1.32 g/cm$^3$. The carousel is held at a reduced temperature of 100° C. to minimize oxidative degradation at the elevated temperatures, since some vials remain in the carousel for many hours prior to analysis. A few hours before injection, vials are rotated into the higher temperature compartment prior to injection.

The columns used are four 30 cm long Mixed A-LS SEC columns from Polymer Laboratories. The multi-angle light scattering instrument is a Wyatt Technology high temperature Dawn DSP. The eluent flows from the columns through a microbore heated transfer line to the external light scattering instrument, and then back to the PL210 column compartment to the other detectors. The heated transfer line and the light scattering instrument are maintained at 140° C. and are controlled by the Wyatt instrument. The returning eluent flows then through the T-splitter to the Viscotek differential viscometer, which is housed within the heated column compartment, and to the differential refractometer, which also is housed within the heated column compartment before exiting the instrument to waste. The interdetector volumes are determined by overlapping the refractive index, light scattering, and viscometry chromatograms for a narrow distribution PE standard. The interdetector volume from the light scattering detector to the viscometer is 0.3 μL; and from the viscometer to the differential refractometer is 0.3 μL. The entire instrument and heating block are housed within a ventilated enclosure.

Data is acquired using the Astra IV software from Wyatt Technology. The AUX1 channel is used to acquire the signal from the differential refractometer, and the AUX2 channel is used to acquire the data from the differential viscometer. The 18 scattering angles are all acquired independently, resulting in 20 chromatograms for each injection. Typically, only the 90° scattering angle chromatogram is displayed, however scattering from all angles is utilized to extract the data at each "slice" of the distribution using the usual light scattering equation valid at this high dilution where concentration effects are negligible.

The detectors at each scattering angle have a different response factor. These were normalized by analyzing 3 low molecular weight narrow distribution linear polyethylenes. The accuracy of these procedures was ascertained using several polyethylene standards, including 3 NIST standards as well as other higher molecular weight linear polyethylene standards. Molecular weights agreed with the NIST certified data within 5%.

Melt Index (MI)

This measurement is obtained from the polymer resin suppliers and generally is measured in accordance with known standard procedures, usually ASTM D1238, in which the MI is tested at 190° C. and 2.16 kg load for polyethylene, 230° C. and 2.16 kg load for polypropylene, respectively.

Density Measurement

This measurement is obtained from the polymer resin suppliers and generally is measured in accordance with known standard procedures, usually ASTM D792.

$^{13}$C NMR

The $^{13}$C-NMR method used to determine the weight percent propylene in the polypropylene homopolymers and interpolymers is the method described by J. C. Randall in his paper "Sequence Distributions versus Catalyst Site Behavior of in Situ Blends of Polypropylene and Poly(ethylene-co-propylene)", Journal of Polymer Science: Part A: Polymer Chemistry, Vol. 36, 1527-1542 (1998), all of the contents of which are incorporated herein by reference.

DSC (ASTM E7941E793)

Differential Scanning Calorimetry (DSC) determines the temperature and heat flow associated with material transitions as a function of time and temperature. The DSC cell is purged with nitrogen gas at a flow rate of 50 ml/minute. Heating and cooling rates are 10° C./min. For polyethylene film samples, the test starts at −50° C. and goes as high as 200° C. Each sample is melted, solidified and remelted. The test method allows for an initial equilibration at −50° C., and the temperature equivalent of five minutes of flat baseline prior to transitioning from heating to cooling, and vice versa. Data is analyzed with the measuring instruments' software. The first heating, cooling, and second heating cycles are plotted separately. The peak melting point values reported in the Tables come from the second heating cycle.

EXAMPLES

The following examples are used to illustrate the invention and should not be used to limit the scope of the appended claims. All parts and percentages are by weight unless otherwise specified.

In the following Table I, relevant properties of various commercial polymers used in the blends of the invention are described.

TABLE I

Polymers - Relevant properties

| Supplier | ID | Description | Melt Index (g/10 min.) | Density (g/cc) |
|---|---|---|---|---|
| Nova | ULDPE1 | ethylene-octene ULDPE interpolymer | 0.90 | 0.912 |
| Dow | ULDPE2 | ethylene-octene ULDPE interpolymer | 1.0 | 0.902 |
| Equistar | LLDPE1 | ethylene-butene LLDPE | 1 | 0.918 |
| Nova | LLDPE2 | ethylene-octene LLDPE interpolymer | 0.55 | 0.918 |
| Basell | PP1 | polypropylene heterogeneous interpolymer | 0.65 | 0.890 |
| Basell | PP2 | polypropylene heterogeneous interpolymer | 0.60 | 0.890 |
| Huntsman | PP3 | propylene homopolymer | 0.5 | 0.900 |
| Huntsman | PP4 | polypropylene homogeneous interpolymer | 2.0 | 0.900 |
| Basell | PP5 | polypropylene heterogeneous interpolymer | 0.45 | 0.900 |
| Huntsman | PP6 | polypropylene heterogeneous interpolymer | 0.7 | 0.900 |

In the following Table 2, measured properties of commercially available polypropylenes are listed.

TABLE 2

Polypropylenes-Measured Properties

| ID | Propylene Content (mole %) | Amorphous Fraction (xylene soluble weight %) | Overall $M_w$ | Xylene Soluble $M_w$ | Xylene Insoluble $M_w$ |
|---|---|---|---|---|---|
| PP1 | 83.0 | 37.95 | 472000 | 475000 | 454000 |
| PP2 | 72.9 | 65.73 | 505000 | 526000 | 269000 |
| PP3 | 100.0 | 0.95 | 605000 | 154000 | 620000 |
| PP4 | 96.0 | 2.55 | 403000 | 65700 | 421000 |
| PP5 | 86.0 | 12.22 | 549000 | 404000 | 556000 |
| PP6 | 79.6 | 19.8 | 280000 | 230000 | 305000 |

PP1 and PP2 are typical examples of the unique heterogeneous polypropylene interpolymers required for this invention. PP3 is a polypropylene homopolymer. PP4 is a homogeneous polypropylene interpolymer. PP5 and PP6 are heterogeneous polypropylene interpolymers, which do not possess the unique properties required for the blend of the invention.

PP1 and PP2 can be distinguished from the other polypropylene interpolymers in the table because they are the only ones which posses an amorphous fraction of at least 30 weight %. In addition, PP1 and PP2 have a higher amorphous fraction $M_w$ than the other polypropylene interpolymers, much higher than PP3, PP4 and PP6. PP1 and PP2 do indeed fall into a very unique subset of the polypropylene interpolymers.

In Table 3, the results of Examples 1 to 5 of the invention and Comparative Examples 1 to 8 are found. These examples provide the basis for the characterization of the films of the invention.

TABLE 3 a table of comparative commercially available films

| Example # | ULDPE 1 (wt %) (FP112A) | ULDPE2 (PL1880) | PP1 (wt %) (Q401/402F) | PP2 (Q100F) | PP-5 (Profax 7823) | PP-6 (Huntsman 18S07A) | LLDPE 1 (M3) | LLDPE2 (FP015A) | Film blowing process stability | "crocodile skin" after steaming | Gelbo-flex pinholes/310 cm² (10K cycles) AVG OF 4 MEASURMENTS |
|---|---|---|---|---|---|---|---|---|---|---|---|
| Example 1 | 75 | | 25 | | | | | | good | little | 1 |
| Example 2 | 50 | | 50 | | | | | | good | none | 2 |
| Example 3 | 33 | | 67 | | | | | | fair | none | 0 |
| Example 4 | | 75 | 25 | | | | | | good | Waiting for Hot Tack Data | 3 |
| Example 5 | | 50 | | 50 | | | | | good | Waiting for Hot Tack Data | 0 |

TABLE 3-continued

| Example # | | | | | | | | | Film blowing process stability | "crocodile skin" after steaming | Gelbo-flex pinholes |
|---|---|---|---|---|---|---|---|---|---|---|---|
| Example 6 | 33 | 67 | | | | | | | fair | Waiting for Hot Tack Data | 1 |
| Example 7 | 75 | 25 | | | | | | | good | Waiting for Hot Tack Data | 0 |
| Example 8 | 50 | 50 | | | | | | | good | Waiting for Hot Tack Data | 0 |
| Example 9 | 33 | 67 | | | | | | | fair | Waiting for Hot Tack Data | 0 |
| Comp Example 1 | 100 | | 0 | | | | | | good | severe | 4 |
| Comp Example 2 | | 100 | | | | | | | fair | severe | 2 |
| Comp Example 3 | 25 | | | | | | 75 | | good | severe | 16 |
| Comp Example 4 | | | | | | | 75 | 25 | good | severe | 14 |
| Comp Example 5 | 0 | | 100 | | | | | | poor | none | 3 |
| Comp Example 6 | | | | 100 | | | | | poor | Not measured | 0 |
| Comp Example 7 | 75 | | | | 25 | | | | Good | little | 7 |
| Comp Example 8 | 75 | | | | | 25 | | | Good | little | 6 |

Film compositions (wt %) and critical properties

| Example # | ULDPE1 | ULDPE2 | PP1 | PP2 | PP5 | PP6 | LLDPE1 | LLDPE2 | Film blowing process stability | "crocodile skin" after steaming | Gelbo-flex pinholes |
|---|---|---|---|---|---|---|---|---|---|---|---|
| Ex. 1 | 75 | | 25 | | | | | | good | minimal | 1 |
| Ex. 2 | 50 | | 50 | | | | | | good | none | 2 |
| Ex. 3 | 33 | | 67 | | | | | | fair | none | 0 |
| Ex. 4 | | 50 | 50 | | | | | | good | minimal | 0 |
| Ex. 5 | | 50 | | 50 | | | | | fair | minimal | 1 |
| Comparative Ex. 1 | 100 | | | | | | | | good | very severe | 4 |
| Comparative Ex. 2 | | 100 | | | | | | | fair | very severe | 2 |
| Comparative Ex. 3 | | | | | | | 100 | | good | severe | 16 |
| Comparative Ex. 4 | | | | | | | 75 | 25 | good | severe | 14 |
| Comparative Ex. 5 | | | 100 | | | | | | poor | none | 3 |
| Comparative Ex. 6 | | | | 100 | | | | | poor | minimal | 0 |
| Comparative Ex. 7 | 75 | | | | 25 | | | | Good | minimal | 7 |
| Comparative Ex. 8 | 75 | | | | | 25 | | | Good | minimal | 6 |

All film compositions set out in Table 3 were prepared by blending the major resin components with additive masterbatches. All of the example films from this invention, and all of the comparative example films, were made on a Brampton Engineering blown film line with the following process variables:

Screw D=1¼ inch
BUR=2.47
Barrel temperature: 180 to 230° C.
Melt temperature: 220° C.
Averaged throughput: 42 kg/hr
Averaged film gauge: 51 micron As can be seen in Table 3, all of the example films meet the target performance properties for improved Flex Crack resistance and thermal resistance, namely less than 5 pinholes per 300 cm$^2$ in the Gelbo Flex test and minimal crocodile skin. All of the comparative examples are deficient in one or both of these critical properties.

Figure 7:
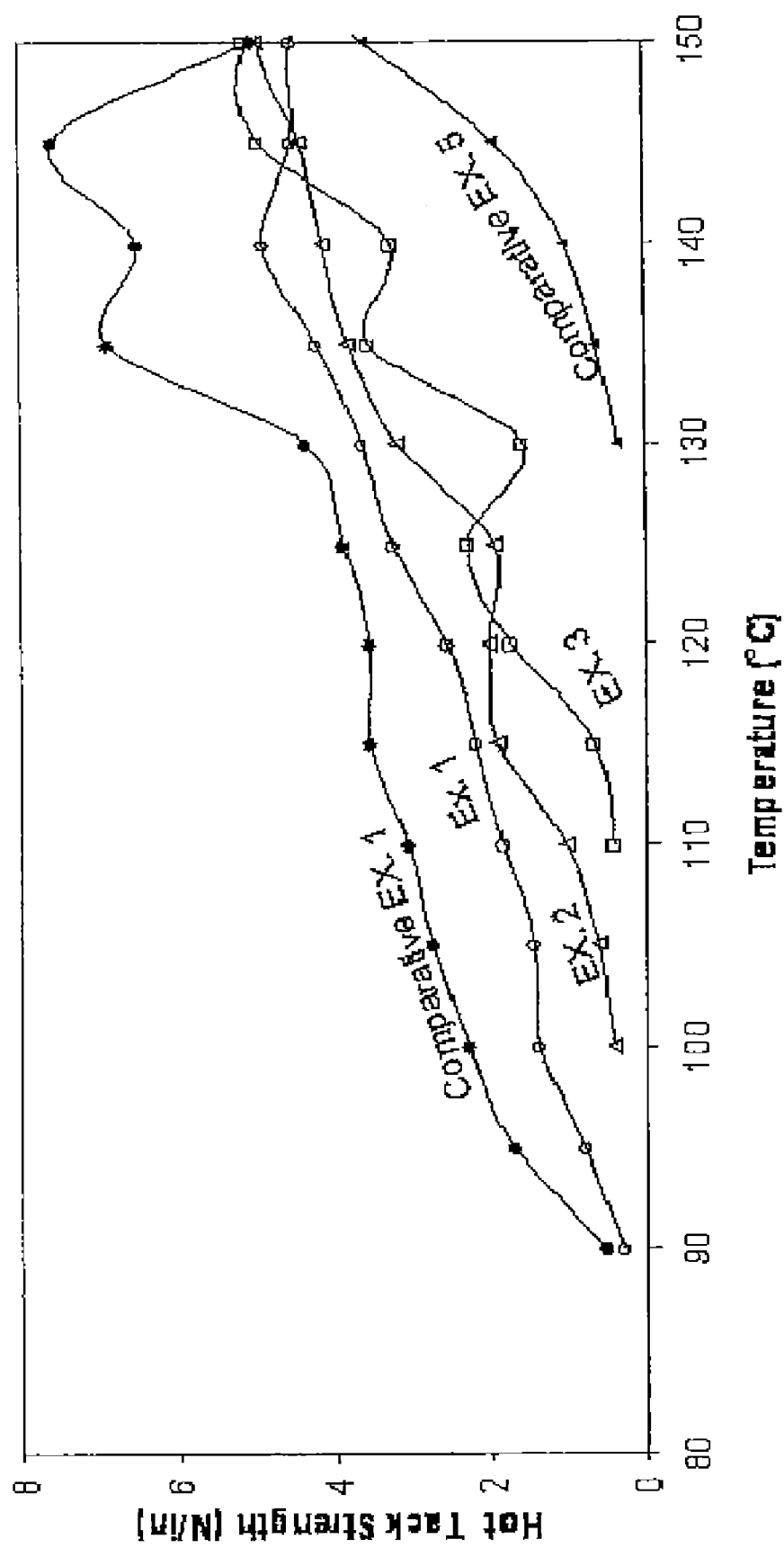
FIG. 7 is a graph that illustrates the Hot Tack properties of films of Examples 1, 2 and 3, and Comparative Examples 1 and 5.

FIG. 7 shows the Hot Tack curves for Example Films 1, 2 and 3 and Comparative Example Films 1 and 5. It can be seen that the Hot Tack Initiation Temperature for Comparative Film 1 is below 100° C. and its Hot Tack Strength is above 5N/inch at some temperatures in the temperature range of 100-150° C. Referring again to Table 3, it can be seen that Comparative Film 1 has severe crocodile skin as a result of its Hot Tack characteristics, which is an indication of poor thermal resistance. The Comparative Example 5 in FIG. 7 has such a high Hot Tack Initiation Temperature (above 140° C.)

that it cannot achieve sufficient Hot Tack Strength over most of the temperature range between 100 to 150° C. This film will have weak seals when made into pouches or bags under standard operating conditions on typical manufacturing equipment.

In FIG. 7, Example Films 1-3 all have Hot Tack Initiation Temperatures between 100-140° C. and Hot Tack Strength below 5 N/inch in the temperature range 100-150° C. Table 3 shows that all of these example films have excellent pinhole resistance and minimal or no crocodile skin. They all process well under standard operating conditions on typical bag or pouch manufacturing equipment.

Figure 8B:
FIGS. 8a and 8b are comparative photographs of films, each of which was laid against a metallized-polyester laminate backing, after being subjected to steam on a filling machine.
Figure 8A:

51 micron thick monofilms of Example Film 2 and Comparative Example Film 1 were laid against a metallized-polyester (metPET) laminate backing and subjected to steam on a filling machine at 135° C. for 10 seconds, with this metPET laminate between the steam and the example films. As can be seen from the photographs found in FIGS. 8a and 8b, the film of the invention exhibits better thermal resistance (less wrinkling or crocodile skin) than the comparative film.

Figure 9A:
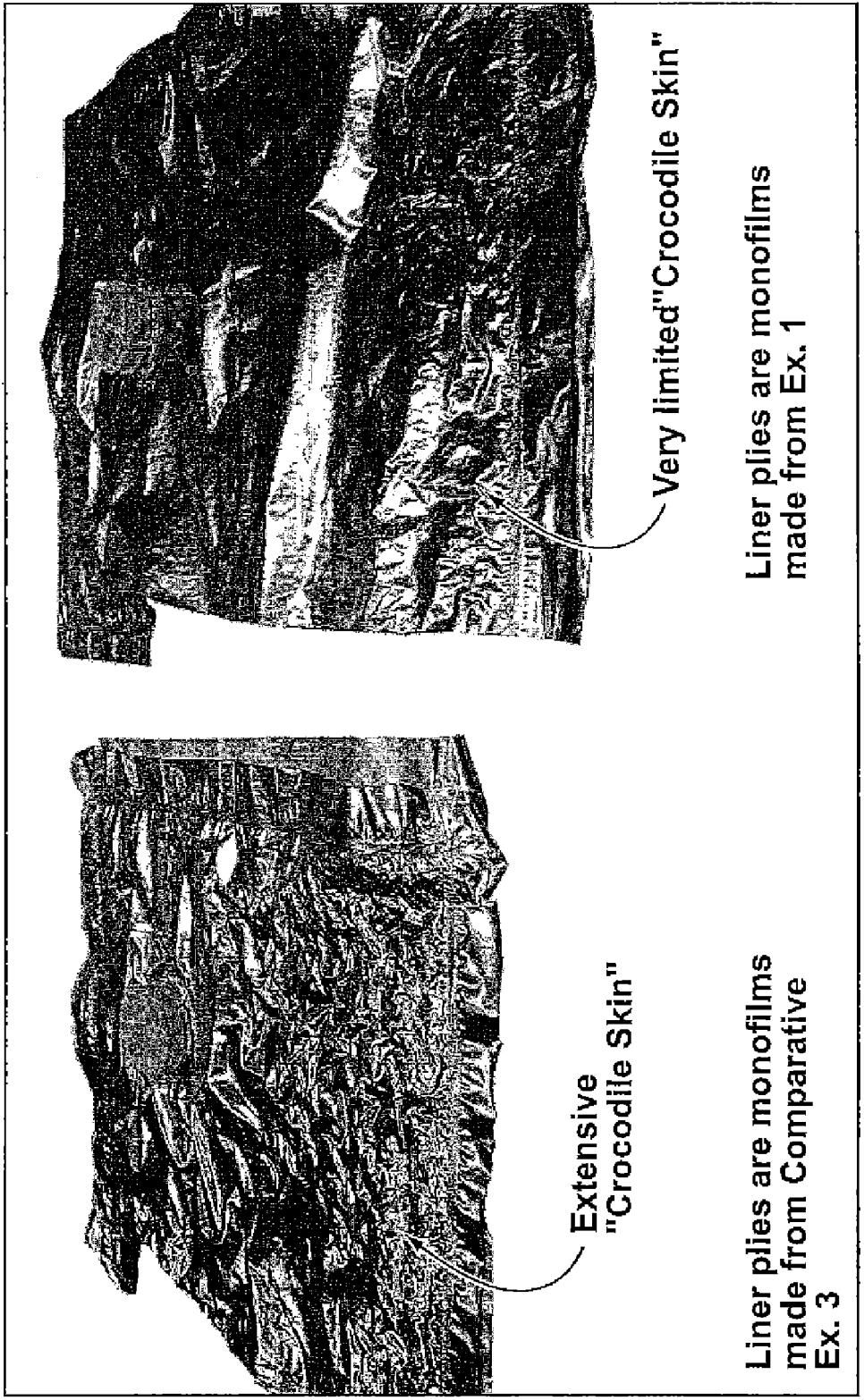
FIGS. 9a and 9b are comparative photographs of bags using inner plies that are comparative ULDPE and LLDPE films, and films as described in Examples 1 and 2 of the present application.
Figure 9B:
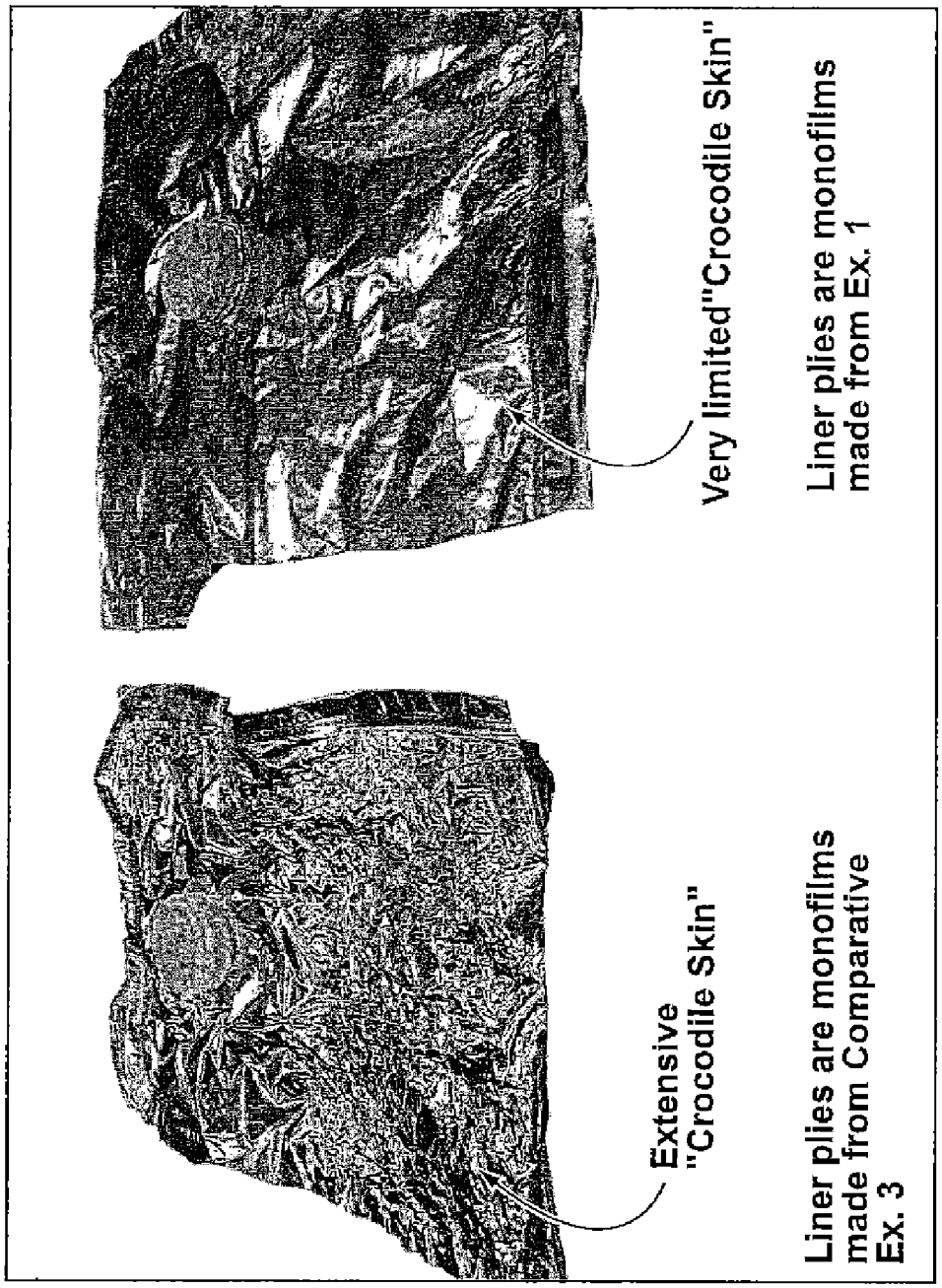

51 micron thick monofilms of Example Films 1 and 2, as well as Comparative Example Film 1 and Comparative Example film 3 (made from 100% LLDPE), were used as the inner and middle plies in 3-ply bags. The outer ply was a metallized-polyester (metPET) laminate. The edges of the bags were sealed using standard heat sealing bars. A fitment was heat-sealed to the bag to allow for attachment to a filling machine. The bags were subjected to steam as follows: the steam started at about 127° C. which cooled as the steam entered the bag; the bags were subjected to a first blast of steam for about 1 second, followed by a 2 second pause and then followed by a second blast of steam for about 1 second. The bags had a small slit cut into the bottom corner of the bag to vent out the steam and prevent the bag from over-inflating and bursting. From the photographs shown in FIGS. 9a and 9b, the bags made from the example films have significantly less wrinkling on the surface of the metallized-polyester laminate than do the comparative films. In addition, sticking between the plies of the bags made from the example films was minimized.

Figure 10:
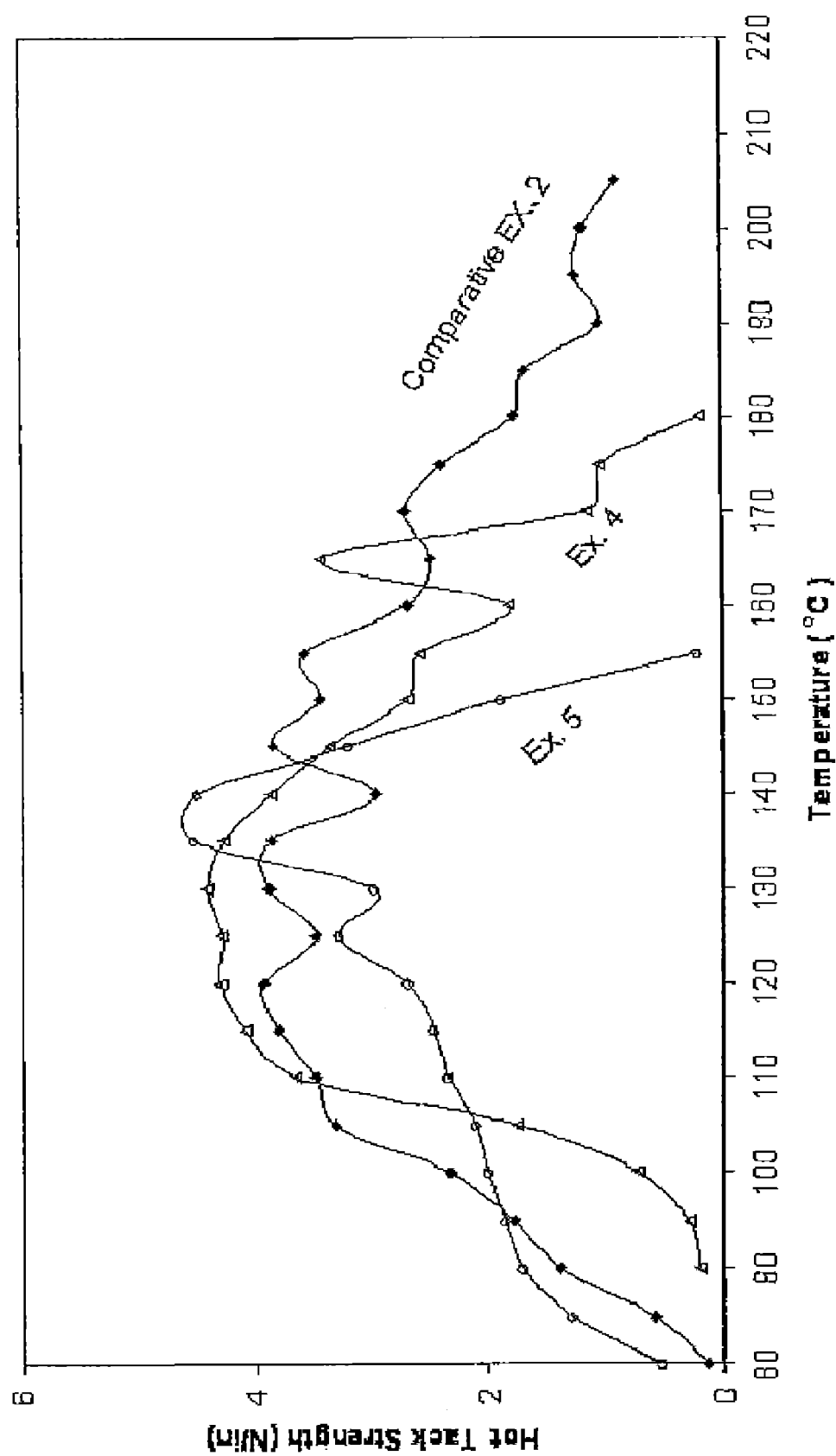
FIG. 10 is a graph that illustrates the Hot Tack properties of films of Examples 4 and 5 and film of Comparative Example 2.

FIG. 10 shows the Hot Tack curves for Example Films 4 and 5 and Comparative Example Film 2. It can be seen that the Hot Tack Initiation Temperature of Comparative Example Film 2 is below 100° C., whereas the Hot Tack Initiation Temperature of Example Films 4 and 5 lies between 100-140° C. As a result, Table 3 shows that Comparative Example Film 2 has severe crocodile skin or wrinkling, while Example Films 4 and 5 show minimal crocodile skin.

Comparative Example Films 3 and 4 are typical commercial bag films made predominantly from LLDPE polyethylene alone, without polypropylene. They have poor flex crack resistance and poor thermal resistance (Table 3). Comparative Example Films 1 and 2 are typical of other commercial bag films made from ULDPE polyethylene and no polypropylene. They have acceptable flex crack resistance, but inferior thermal resistance.

In each of Comparative Example Films 7 and 8, a heterogeneous polypropylene interpolymer, which is outside of the proposed range for the invention, is used in the blend along with ULDPE-1. As can be seen in Table 3, the resulting films have improved thermal resistance, but the Gelbo Flex performance has deteriorated to an unacceptable level (above 5 pinholes per 300 cm$^2$).

What is claimed is:

1. An improved pouch-making process comprising the steps of:
   (I) providing a monofilm or a multilayer film, said film comprising a flowable material packaging film comprising at least a resin blend of:
      (a) from about 33 wt % to about 80 wt % of at least one ethylene-$C_4$ to $C_{10}$-α-olefin interpolymer having a melt-index of from 0.4 to 1.5 g/10 min (190° C., 2.15 kg), and a density of from 0.900 to 0.916 g/cm$^3$; and
      (b) from about 67 wt % to about 20 wt % of at least one propylene-based heterogeneous interpolymer of propylene with ethylene, or of at least one propylene-based heterogeneous interpolymer of propylene with ethylene and butene, said propylene-based heterogeneous interpolymer comprising:
         (i) from about 71 mol % to about 86 mol % propylene, and
         (ii) from about 29 mol % to about 14 mol % ethylene or ethylene and butene,
         wherein said propylene-based heterogeneous interpolymer has an overall weight average molecular weight ($M_w$) of at least about 400,000, a xylene soluble phase of not less than 30 wt %, with the xylene soluble phase having a $M_w$ of at least about 275,000, and
         wherein said propylene-based heterogeneous propylene-based interpolymer has a density of from 0.875 to 0.91 g/cm$^3$;
      wherein said film has a Hot Tack Initiation Temperature in the range of from about 100° C. to about 140° C. and a Hot Tack Strength of not more than about 5 N/inch in the temperature range of about 100° C. to about 150° C., when fabricated at a thickness of about 50 µm and tested using a JB Instrument Hot Tack Tester set at a 0.5 second dwell, 0.2 second delay time, 40 psi seal bar pressure, and 250mm/second peel rate; and
      wherein said film has a flex crack resistance such that it develops 5 or less pinholes per 300 cm$^2$ in 10,000 cycles of Gelbo Flex testing as measured according to ASTM F392;
   (II) forming said film into a tubular member;
   (III) heat-sealing longitudinal edges and then filling said pouch with flowable material;
   (IV) heat-sealing a first transverse end of said tubular member to form a pouch; and
   (V) sealing and cutting through a second transverse end of said tubular member to provide a filled pouch; said tubular member being filled continuously or intermittently; wherein said upper transverse seal is the bottom seal of the next pouch to be formed and filled.

2. The improved pouch-making process as recited in claim 1, further comprising the step of sterilizing said film used to make the pouch.

3. The improved pouch-making process as recited in claim 1, wherein said flowable material is a liquid.

4. The improved pouch-making process as recited in claim 1, wherein said resin blend comprises:
   (a) from about 33 wt % to about 75 wt % of said at least one ethylene-$C_4$ to $C_{10}$-α-olefin interpolymer, and
   (b) from about 67 wt % to about 25 wt % of said at least one propylene-based heterogeneous interpolymer of propylene with ethylene or ethylene and butene.

5. The improved pouch-making process as recited in claim 1, wherein said resin blend comprises:
   (a) from about 50 wt % to about 75 wt % of said at least one ethylene-$C_4$ to $C_{10}$-α-olefin interpolymer, and (b) from about 50 wt % to about 25 wt % of the at least one propylene-based heterogeneous interpolymer of propylene with ethylene or ethylene and butene.

6. The improved pouch-making process as recited in claim 1, wherein the Hot Tack Strength ranges from about 1 to about 5 N/inch at a temperature in the range of from about 120° C. to about 150° C.

7. The improved pouch-making process as recited in claim 1, wherein said $C_4$ to $C_{10}$ α-olefin is selected from butene, hexene, and octene.

8. The improved pouch-making process as recited in claim 1, wherein said flowable material packaging film further comprises one or more film processing additives for antioxidation, UV light stabilization, antiblocking, slippage, blend compatibility and ease of processing.

9. The improved pouch-making process as recited in claim 8;
wherein said one or more film processing additives are selected from processing masterbatches, colorant masterbatches, at least one low density ethylene homopolymer, copolymer or interpolymer which is different from component (a) of the inventive blend, at least one polymer selected from the group comprising EVA, EMA, EAA, and at least one polypropylene homopolymer or polypropylene interpolymer which is different from component (b) of the inventive blend; and
wherein and the additional components are present in the range of from 0 to about 30 wt %.

10. The improved pouch-making process as recited in claim 9, wherein said one or more film processing additives are present in the range of from about 3 to about 30 wt %.

11. The improved pouch-making process as recited in claim 1;
wherein said film comprising said flowable material packaging film is a monofilm for use in making bags or pouches for packaging flowable materials; and
wherein said monofilm has a thickness of from about 20 to about 150 μm.

12. The improved pouch-making process as recited in claim 1;
wherein said film comprising said flowable material packaging film is a multilayer film for use in making bags or pouches for packaging flowable materials; and
wherein at least one layer of said multilayer film has a thickness of from about 20 to about 150 μm.

13. The improved pouch-making process as recited in claim 1;
further comprising preparing a multi-ply film structure for use in making bags or pouches for packaging flowable material;
wherein said film comprising said flowable material packaging film is a monofilm for use in making bags or pouches for packaging flowable materials; and
wherein said monofilm has a thickness of from about 20 to about 150 μm.

14. The improved pouch-making process as recited in claim 13, wherein said monofilm is at least one of an intermediate ply, an inner ply, and an outer ply.

15. The improved pouch-making process as recited in claim 14, wherein said film or bag is sterilized.

16. The improved pouch-making process as recited in claim 1;
further comprising preparing a multi-ply film structure for use in making bags or pouches for packaging flowable material;
wherein said film comprising said flowable material packaging film is a multilayer film for use in making bags or pouches for packaging flowable materials; and
wherein at least one layer of said multilayer film has a thickness of from about 20 to about 150 μm.

17. The improved pouch-making process as recited in claim 16, wherein said at least one layer of said multilayer film is at least one of an intermediate ply, an inner ply, and an outer ply.

18. The improved pouch-making process as recited in claim 17, wherein said film or bag is sterilized.

* * * * *